Patented June 12, 1951

2,556,158

UNITED STATES PATENT OFFICE 2,556,158

CONDENSATION PRODUCTS OF ETHYLENE AND RUBBER

James P. West, Westmont, Ill., assignor to Universal Oil Products Company, Chicago, Ill., a corporation of Delaware No Drawing. Application September 29, 1949, Serial No. 118,707

6 Claims. (Cl. 260—4)

This invention relates to new and useful waxes. It is more specifically concerned with the production of waxes by the organic peroxide-catalyzed condensation of ethylene with raw rubber in the presence of a saturated hydrocarbon diluent.

The peroxide-catalyzed polymerization of ethylene is assuming growing importance due to the increasing utilization of the products thereby produced. Some of the polymerization processes of this type use as a diluent a saturated hydrocarbon containing at least three carbon atoms per molecule. When diluents of this type are employed at low to moderate pressures, i. e., not exceeding several hundred atmospheres, the polymer produced is quite soft, has a relatively low melting point and possesses a grease-like consistency. I have found that the presence of olefins in such polymerization processes has heretofore been avoided, because it was generally believed that they inhibit the polymerization reaction. However, I have discovered that when ethylene is subjected to the action of an organic peroxide in the presence of a saturated hydrocarbon diluent and a minor amount of rubber, not only is the reaction not inhibited, but on the contrary, it is enhanced as evidenced by greater yields, and the product is different from that obtained in the absence of rubber. Surprisingly, the waxes thus produced have been shown to be a condensation product of ethylene and rubber. The waxes are harder, have a higher melting point, and a viscosity, tack, etc., that are different from the grease-like polymers produced in the absence of rubber. These new compositions are useful for the preparation of special grease, rubber extenders, and the like.

In one embodiment my invention relates to the solid wax-like condensation product produced by interacting ethylene and raw rubber at condensation conditions in the presence of an organic peroxide condensation catalyst and a saturated hydrocarbon diluent containing at least three carbon atoms per molecule.

In another embodiment my invention relates to a process which comprises subjecting ethylene to the action of an organic peroxide condensation catalyst at condensation conditions in the presence of a saturated hydrocarbon diluent containing at least three carbon atoms per molecule and an amount of raw rubber sufficient to increase the melting point of the product.

The ethylene charged to my process may be obtained from any source, such as the oxidative cracking of ethane, the dehydrogenation of ethane, the dehydration of ethyl alcohol, and particularly the thermal and catalytic cracking and reforming of higher boiling hydrocarbons. Many of the known processes for polymerizing ethylene require a highly purified charge stock, i. e., the ethylene has to be substantially free from other hydrocarbons and from dissolved oxygen. In contrast, the yield and quality of the condensation product made in my process are substantially unaffected by the presence of other hydrocarbons, such as ethane, or by the presence of dissolved oxygen. Thus, an ethane-ethylene fraction may be charged to the process of this invention together with a suitable organic peroxide condensation catalyst, a saturated hydrocarbon diluent, and a quantity of raw rubber sufficient to increase the melting point of the product.

The diluents that may be used in the preparation of my process may be any saturated hydrocarbon containing three or more carbon atoms or a mixture of such hydrocarbons. The preferred paraffins contain four or more carbon atoms and the preferred cycloparaffins contain five or more carbon atoms in the ring. As will be shown in the examples, the addition of rubber to the reaction mixture has relatively little effect on the nature of the product when an aromatic hydrocarbon diluent such as benzene is employed, and the yield of product is decreased rather than increased.

The catalysts that may be used in the present process comprise those organic peroxides that catalyze the polymerization of ethylene. These substances include peracetic acid, di-acetyl peroxide, toluic acid peroxide, oleic peroxide, benzoyl peroxide, t-butyl perbenzoate, di-t-butyl peroxide, hexyl peroxide, t-butyl hydroperoxide, and methylcyclohexyl hydroperoxide.

The rubber that may be used in the present process can be characterized as raw rubber, by which I mean natural or synthetic rubber in which the primary unit structural group is a hydrocarbon group and which has had substantially no extraneous material chemically or physically incorporated therein. Examples of natural raw rubber are pale crepe, brown crepe, blanket crepe, unsmoked sheet, whole latex rubber, first latex sheet, and first latex crepe. Suitable types of synthetic raw rubber comprise those in which the principal unit structural group is a hydrocarbon group and are usually made from a butadiene or isoprene.

The process of my invention may be carried out in batch operation by placing a quantity of diluent, the rubber, and the catalyst in a reactor equipped with a mixing device, adding the ethylene, heating to a reaction temperature while mixing the contents of the reactor, cooling after a suitable period of time, and recovering the solid product.

The preferred method of operation is of the continuous type. In this method of operation the ethylene, diluent, rubber, and catalyst are continuously charged to a reactor maintained under suitable conditions of temperature and pressure. The reactor may be an unpacked vessel or coil or it may contain an absorbent packing material, such as fire brick, alumina, dehydrated bauxite, and the like. The condensation product is separated from the reactor effluent, usually by fractionation. The diluent and the unconverted ethylene may be recycled to the reaction zone. In many cases, it is more convenient to dissolve the rubber in the hydrocarbon diluent before charging the same to the reaction zone.

In the continuous methods of carrying out my process the catalyst ordinarily is added continuously to the reaction zone, but, if desired, it may be added intermittently, particularly when a packing material which tends to retain catalyst is employed in the reactor.

The temperature employed in the process of this invention should be at least as high as the initial decomposition temperature of the peroxide used as the catalyst. In the case of t-butyl perbenzoate, for example, the decomposition temperature is approximately 115° C. Higher temperatures may be employed, but ordinarily little advantage is gained if the temperature is more than about 150° C. higher than the decomposition temperature of the catalyst. In contrast to many of the prior art processes, pressures as low as 15 atmospheres and lower may be employed with good results in my process. On the other hand, pressures as high as 500 atmospheres or greater may be used.

The concentration of catalyst utilizable in my process can vary over a wide range. For reasons of economy, it generally is advisable to use low concentrations of catalyst such as from about 0.1% to about 4% of the ethylene charged. Similarly, the concentrations of rubber used in my process can vary over a wide range. Usually, only a very minor amount of rubber is needed to affect the property in the products. Generally, the amount of rubber will be about equal to or less than the amount of the peroxide employed.

In batch operation and in flow operations that do not employ packing materials, the contact time ordinarily will be in the range of from about three minutes to about six hours. Contact times of at least ten minutes usually are preferred. In fixed bed operations, the space velocity, defined as the volume of liquid charged per hour divided by the superficial volume of the packing, ordinarily will be in the range of from about 0.1 to about 10. The ratio of diluent to ethylene charged to the reaction zone may vary over a relatively broad range, i. e., the ratio is not particularly critical so long as there is sufficient diluent to effect dissolution of the ethylene and the product derived therefrom. A 1:1 ratio ordinarily is satisfactory, but capital and operating costs may dictate the use of higher or lower ratios.

The following examples are given to illustrate my invention, but they are not introduced with the intention of unduly limiting the generally broad scope of said invention.

EXAMPLE I

In the experiments given in Table 1, 46 grams of methylcyclohexane and 5 grams of di-t-butyl peroxide were charged to the glass liner of an 850 cc. rotating autoclave. When rubber was used in the experiment, it was dissolved in the methylcyclohexane before the latter was charged to the glass liner. The autoclave was then charged to 50 atmospheres pressure with ethylene and heated to 140° C. for 4 hours under the pressure generated by the materials within the autoclave. After the reaction period, the autoclave was cooled, and the liquid product was removed and distilled and the solid part recovered. The operating conditions and results are shown in the following table:

Table 1

| Experiment No. | 1 | 2 | 3 |
| --- | --- | --- | --- |
| Raw Natural Crepe Rubber, g | 0 | 0.4 | 2.1 |
| Methylcyclohexane, g | 46.0 | 46.0 | 46.0 |
| Di-t-butyl peroxide, g | 5 | 5 | 5 |
| Maximum Temperature, °C | 140 | 140 | 140 |
| Maximum Pressure, Atm | 114 | 113 | 130 |
| Final Pressure at Room Temp., Atm | 30 | 32 | 40 |
| Solid Product: | | | |
| Weight, g | 31 | 49 | 38 |
| Consistency | Greaselike | Waxy | Waxy |
| Melting Point, °C | 77 | 83 | 91 |

It can be seen that the addition of rubber to the reaction mixture brought about a substantial increase in the yield of the product as well as in the consistency and melting point thereof.

That the wax produced in the presence of the rubber was a condensation product of ethylene and rubber is shown by the following data. The product prepared in the presence of rubber in experiment 2 was a hard wax and had a melting point of 83° C. and a kinematic viscosity of 86.48 cst, at 210° F., or a Universal viscosity of 402 seconds at this temperature. In contrast, the product produced in experiment 1 in the absence of rubber was grease-like and had a melting point of 77° C. When this grease-like product was heated with a solution of rubber and methylcyclohexane (the amount of rubber being proportionate to that present in experiment 2) and the methylcyclohexane evaporated, there was obtained a grease-like product melting at 78–81° C. The kinematic viscosity at 210° F. was only 17.29 cst., and the Universal viscosity only 86.9 secs. Therefore, it may be concluded that the product obtained by blending a methylcyclohexane solution of rubber with ethylene polymer was merely a solution of rubber in the polymer, whereas the product obtained by heating the methylcyclohexane solution of rubber with ethylene in the presence of an organic peroxide catalyst produced a material that was a condensation product of rubber with ethylene.

EXAMPLE II

The experiments given in Table 2 were made to determine whether the presence of rubber would affect the reaction and the properties of the product when using benzene instead of methylcyclohexane as the diluent. The experiments were performed in the same manner as the experiments listed under Example I.

*Table 2*

| Experiment No. | 4 | 5 |
|---|---|---|
| Raw Natural Crepe Rubber, g | 0 | 1.0 |
| Benzene, g | 50 | 50 |
| Di-t-butyl peroxide, g | 5 | 5 |
| Maximum Temperature, °C | 140 | 140 |
| Maximum Pressure, Atm | 138 | 133 |
| Final Pressure at Room Temp., Atm | 33 | 35 |
| Solid Product: | | |
| Weight, g | 65 | 52 |
| Consistency | Waxy | Waxy |
| Melting Point, °C | 90 | 93 |

It can be seen that the presence of the rubber did not affect the consistency of the product and it decreased the yield thereof.

I claim as my invention:

1. A process for the production of a solid wax-like product which comprises subjecting ethylene to the action of an organic peroxide catalyst at a temperature at least as high as the decomposition temperature of the peroxide catalyst and under superatmospheric pressure in the presence of a saturated hydrocarbon diluent of at least three carbon atoms per molecule and a minor amount of a rubber selected from the group consisting of the rubbery polymers of isoprene and of butadiene.

2. A process for the production of a solid wax-like product which comprises subjecting ethylene to the action of an organic peroxide catalyst at a temperature at least as high as the decomposition temperature of the peroxide catalyst and under superatmospheric pressure in the presence of a saturated hydrocarbon diluent of at least three carbon atoms per molecule and a minor amount of a natural rubber.

3. The process of claim 1 further characterized in that said diluent comprises a cycloparaffin containing at least five carbon atoms in the ring.

4. The process of claim 2 further characterized in that said diluent comprises a cycloparaffin containing at least five carbon atoms in the ring.

5. The solid wax-like product produced by the process of claim 1.

6. The solid wax-like product produced by the process of claim 2.

JAMES P. WEST.

REFERENCES CITED

The following references are of record in the file of this patent:

UNITED STATES PATENTS

| Number | Name | Date |
|---|---|---|
| 2,482,877 | Schmerling | Sept. 27, 1949 |